(12) United States Patent
Miller

(10) Patent No.: US 6,226,363 B1
(45) Date of Patent: May 1, 2001

(54) METHOD AND SYSTEM FOR THE RECORDING AND SELECTIVE ACCESSING OF MESSAGES USING A COMPUTER, A REMOTE UNIT, AND A PUBLIC COMMUNICATION SYSTEM

(76) Inventor: James H. Miller, 425 Elm Ave., Reading, PA (US) 19605

(*) Notice: Subject to any disclaimer, the term of this patent is extended or adjusted under 35 U.S.C. 154(b) by 0 days.

(21) Appl. No.: 09/062,706

(22) Filed: Apr. 20, 1998

(51) Int. Cl.⁷ .................. H04M 1/64; G06F 7/00
(52) U.S. Cl. ................. 379/88.27; 379/88.24; 707/6
(58) Field of Search .............. 379/88.23, 88.24, 379/88.25, 88.22, 88.26, 88.06, 88.27; 707/6; 704/10

(56) References Cited

U.S. PATENT DOCUMENTS

| | | | |
|---|---|---|---|
| 4,304,968 | 12/1981 | Klausner et al. | 379/69 |
| 4,588,857 | 5/1986 | Arsem | 379/76 |
| 4,982,420 | 1/1991 | Theis | 379/70 |
| 4,985,913 | 1/1991 | Shalom et al. | 379/76 |
| 5,003,574 | 3/1991 | Denq et al. | 379/75 |
| 5,031,206 | 7/1991 | Riskin | 379/93.27 |
| 5,163,084 | 11/1992 | Kim et al. | 379/88.01 |
| 5,255,310 | 10/1993 | Kim et al. | 379/88.01 |
| 5,283,731 | 2/1994 | Lalonde et al. | 705/1 |
| 5,283,818 | 2/1994 | Klausner et al. | 379/88.25 |
| 5,333,180 * | 7/1994 | Brown et al. | 379/88.06 |
| 5,337,347 | 8/1994 | Halstead-Nussloch et al. | 379/88.14 |
| 5,390,236 | 2/1995 | Klausner et al. | 379/88.11 |
| 5,475,739 | 12/1995 | Norimatsu | 379/70 |
| 5,485,506 | 1/1996 | Recht et al. | 379/88.12 |
| 5,572,576 | 11/1996 | Klausner et al. | 379/88.11 |
| 5,797,124 * | 8/1998 | Walsh et al. | 379/88.04 |
| 6,069,940 * | 5/2000 | Carleton et al. | 379/88.04 |

* cited by examiner

Primary Examiner—Fan Tsang
Assistant Examiner—Ovidio Escalante
(74) Attorney, Agent, or Firm—Jones Volentine, L.L.C.

(57) ABSTRACT

A telephone messaging system is provided that includes a telephonic component, a computer, and an interface between the telephonic component and the computer. The telephonic component receives and processes messaging requests from a remote unit. The computer stores messages and provides message information to the telephonic component in response to the messaging requests. The interface allows the computer to operate at a faster speed than the telephonic component. The computer contains a fast memory and a primary storage device for storing message data. The telephone messaging system is accessed by first storing a message in memory, then providing an n-word title for the message, each word being k-characters. Then a number of topic terms are created to identify the message by combining the n words from the title in two-word combinations without concern as to the order of each of the n topic words in the q topic terms. Messages stored in the system can then be accessed by the topic terms.

14 Claims, 2 Drawing Sheets

METHOD AND SYSTEM FOR THE RECORDING AND SELECTIVE ACCESSING OF MESSAGES USING A COMPUTER, A REMOTE UNIT, AND A PUBLIC COMMUNICATION SYSTEM

BACKGROUND OF THE INVENTION

1. Field of the Invention

The present invention is directed to a method and system for recording and selectively accessing voice messages using a computer, a telephonic component, and a telephone system. More specifically, the present invention is directed to the system and method using titles to describe messages and topics to select messages.

2. Description of Related Art

A conventional messaging system stores a number of voice messages in a central memory, indexing each of them by an associated mailbox number, extension number, topical category, or the like. Users of the messaging system can call into the system from a remote location via telephone, and can access messages using a standard touch-tone keypad.

These messaging systems can be used in a variety of situations where one party desires to leave a message for another. It is useful in the obvious case of a personal mailbox for holding personal messages. However, such messaging systems are also useful in situations where a large number of messages relating to a variety of topics are provided for access by multiple people. For example, a telephone classified ad (want ad) service might include messages regarding objects for sale categorized by type. Similarly, a telephone dating service might include messages regarding members of the service categorized by gender, geographical location, interests, etc. In addition, a local club or service organization may desire a way to communicate information to its members regarding meetings, programs, and projects.

Typically, the callers access the messages on a telephone answering system by using the mailbox number, extension number, etc. A caller enters the number desired and the messages identified by that number are played. However, this means that in order to access a message, the caller must either know the identifying number associated with that message or messages, or must listen through all of the messages until the desired message is reached. To avoid wasted time listening to all of the messages, the caller must therefore have a list of the message categories and their associated numbers. In the case of large messaging systems, these lists can contain thousands of descriptions. For successful message location, the caller must not only have the list, but must take time to search the list for the proper description and then enter its number.

An alternative to this method has been the use of recorded menus to direct callers to the desired messages. These menus present a number of choices to the caller, who is then asked to select one of the choices presented. A short explanation of each choice is given and each choice is assigned a number.

In order to reduce the required search time for a given message, the categories may be formed into a tree structure, where the first menu directs the caller to one of a variety of second menus. Additional levels of menus may be added as needed. In this case, after the caller makes a selection from the first menu, the second menu associated with the caller's choice is presented along with a short explanation, and the selection process is repeated. For a list of thousands of descriptions, the menu process may be repeated many times. At each level, the caller is asked to listen to a brief explanation before making a choice. As a result, this process can take several minutes.

Also, while accessing the messaging system, a caller may want to listen to multiple messages. Thus, after hearing a first message, the caller may then desire to hear a second or more messages. Unfortunately in conventional systems, once the caller proceeds to a new request, it is impossible to return to the previous request without repeating the selection process. The previous list of accessed messages is not retained by any conventional system.

In addition, each message may contain information that is also contained in other messages. This is wasteful of memory space by requiring that identical information be stored multiple times. This is also wasteful of the caller's time, since the caller will have to listen to identical information when accessing each of the messages.

Another problem with conventional messaging systems has been the time it takes to place new messages onto the system. Traditionally only the supervisor of the system can place new messages on the system. New messages entered by users are generally placed into a queue awaiting entry by the supervisor. In some cases, this can take a month or more before they are finally placed on the system, depending upon how busy the supervisor is. More rapid entry of messages would either take up the valuable time of the supervisor or could require the services of additional personnel. For example, in the case of hundreds of voice messages to be entered each day, more than one full time employee would be required.

Furthermore, the human voice can be digitized at the rate of 64 thousand bits per second. This is a very slow rate for a modern computer, which typically works at 64 million bits per second. In conventional systems, voice communications can unnecessarily tie up the input/output resources of the computer.

SUMMARY OF THE INVENTION

One object of this invention is to provide a more efficient method for selecting messages. When the caller enters a topic term, the system will play the first message in the list for that topic term. The list of messages for each topic term is stored in the memory of the computer. Each list is in the order in which the messages were posted onto the system. Hundreds of the most recently read messages are stored in memory. If one of these messages is selected, the system can start to play it immediately. Otherwise, the message is read from the disk drive, which usually takes less than one second.

Another object of the present invention is a method to facilitate the recording of messages. After a caller has given correct identification, the caller can record a message, enter its title, enter its related messages numbers, and then post it onto the system.

The system is controlled by Numeric Key Sequences. A numeric key sequence (NKS) is entered by depressing numeric keys on the telephone device. In the preferred embodiment, if a character is required the caller must depress the numeric key associated with the character desired. If the "*" key is pressed during a NKS, the previous numeric key will be removed from the sequence. When an NKS is being entered the caller's current task will stop. After the NKS is entered; the "#" key must be depressed, so the caller's new task will start.

An identification is a 9-key NKS. The first 4 keys are for a person's identification number and the last 5 keys are for a password. If the entry is made correctly, the system will reply with an indication that the identification is accepted.

To create a topic term, the caller picks two words that pertain to the desired subject. A topic term is an 8-key NKS. The caller enters only the first 4 characters of each word. If a word requires fewer than 4 characters, it is extended to 4 characters by adding the zero character as many times as necessary to the end of the word. A word can be a number, such as "1998".

A message can be linked to other messages, so the same information does not have to be repeated. This saves space on the system by eliminating duplicate information and allows the caller to save time by not hearing the information. Before posting a message, the caller can enter 4 such links. A message number is always 6 digits.

A link is a 7-key NKS. The first key is a 1, 2, 3, or 4 to designate which one of the 4 links and the remaining keys are for the linked-to message number. If the caller wanted the 1st link to message 456789, the NKS would be "1456789". Each message is always linked to the identification message of its creator. This identification message is played, when the caller enters a NKS of "W", i.e., executes a "who" command.

In the preferred embodiment, a message can have four words in its title. These words are used to place the message in topic term lists. Before posting a message, the caller can enter 4 such words. The caller enters only the first four characters of the word. If a word has fewer than 4 characters, it is extended to 4 characters by adding one or more zero characters to the end of the word. Preferably the "1" character is used in place of any special characters such as "&," "-," "%," etc.

A title-word is a 5-key NKS. The first key is a 1, 2, 3, or 4 to designate which one of the 4 title-words and the remaining keys are for the word. If the caller wanted the 4th title-word to be ABBA, the NKS would be "42222."

Another object of this invention is to remove the telephonic component of the system from the computer unit. This allows for the use of a standard personal computer. The computer sends and receives data from the telephone component, as if it were a disk drive. It uses the standard EIDE interface.

The telephonic unit was designed specifically for the use of this system. This unit can control 128 phone lines, without the aid of the computer. It buffers the data by phone line, and sends it to the computer as information from one phone line. The communications with the computer are at a very high speed. Less than one fourth of the computer's time is used to communicate with the telephonic unit. A burst of information takes only 32 microseconds and occurs only 6800 times per second.

In the preferred embodiment, the computer software was designed specifically for this process. There is no "Operating System" being used. This allows the software to use the resources of the computer without the interference of other software. The software controls the communications to the disk drives, as it does to the telephonic unit. This allows the system to store the list of all the messages for each topic term in the random access memory (RAM) of the computer. The system can use the Real Mode of the computer, instead of having to use the Protected Mode, which is required by an operating system. This significantly increases the efficiency of the computer. However, in alternate embodiments the program could run in the Protected Mode or could be executed under an operating system.

According to one aspect of the present invention, a telephone messaging system is provided, comprising: a telephonic component for receiving and processing the messaging requests from a remote unit, a computer for storing messages and providing message information to the telephonic component in response to the messaging requests, an interface between the telephonic component and the computer to allow the computer to operate at a faster speed than the telephonic component.

The computer may further comprise a fast memory for storing data used most recently by the telephone messaging system, a primary storage device for storing all of the data used by the telephone messaging system, and a microprocessor for controlling the operation of the computer. The computer may further comprise a backup storage device for storing a copy of all of the data used by the telephone messaging system.

Preferably, the telephonic component operates at a speed of about 6800 cycles per second and the computer operates at a speed of at least 4 million cycles per second. The telephonic component may receive and process messages from a conventional telephone switching network.

According to another aspect of the invention, a method is provided for storing and requesting messages in a remotely-accessed messaging system, comprising the steps of: storing a message in memory, providing a title for the message, the title having n title words, forming n topic words, each having an ideal word length of k characters by making the $j^{th}$ topic word equal to the $j^{th}$ title word if the length of the $j^{th}$ title word is equal to the ideal word length, making the $j^{th}$ topic word equal to the first k characters of the $j^{th}$ title word if the length of the $j^{th}$ title word is greater than the ideal word length, and making the $j^{th}$ topic word equal to the $j^{th}$ title word plus a (k–i) filler characters, where i is the length of the $j^{th}$ title word, if the length of the $j^{th}$ title word is less than the ideal word length, forming q topic terms associated with the stored message by combining the n topic words in combinations of m topic words, wherein n is an integer greater than one, k is an integer greater than one, m is an integer greater than one but not greater than n, j is an index that varies from 1 to m, and q equals the number of different combinations of n different things taken m at a time without repetition.

In this system, messages stored in the messaging system can be requested by topic term. Each stored message can also be linked directly to a plurality of other messages, and the other messages can be accessed directly from the stored message. Preferably, n is an integer between 2 and 4, k is equal to 4, and the filler character is the zero character, "0".

The method for storing and requesting messages in a remotely-accessed messaging system may further comprise the step of requesting to hear messages in a topic term list by entering a topic term for particular subject words. The topic term may comprise m topic words derived from the m subject words and having the ideal word length of k characters.

Each topic word is preferably formed from one of m subject words by the steps of: making the $p^{th}$ topic word equal to the $p^{th}$ subject word if the length of the $p^{th}$ subject word is equal to the ideal word length, making the $p^{th}$ topic word equal to the first k characters of the $p^{th}$ subject word if the length of the $p^{th}$ subject word is greater than the ideal word length, and making the $p^{th}$ topic word equal to the $p^{th}$ subject word plus a (k–r) filler characters, where r is the length of the $p^{th}$ subject word, if the length of the $p^{th}$ subject word is less than the ideal word length, where p is an index that varies from 1 to m.

BRIEF DESCRIPTION OF THE DRAWINGS

The above and other objects and advantages of the present invention will become readily apparent from the description that follows, with reference to the accompanying drawings, in which.

DETAILED DESCRIPTION OF THE PREFERRED EMBODIMENT

Figure 1:
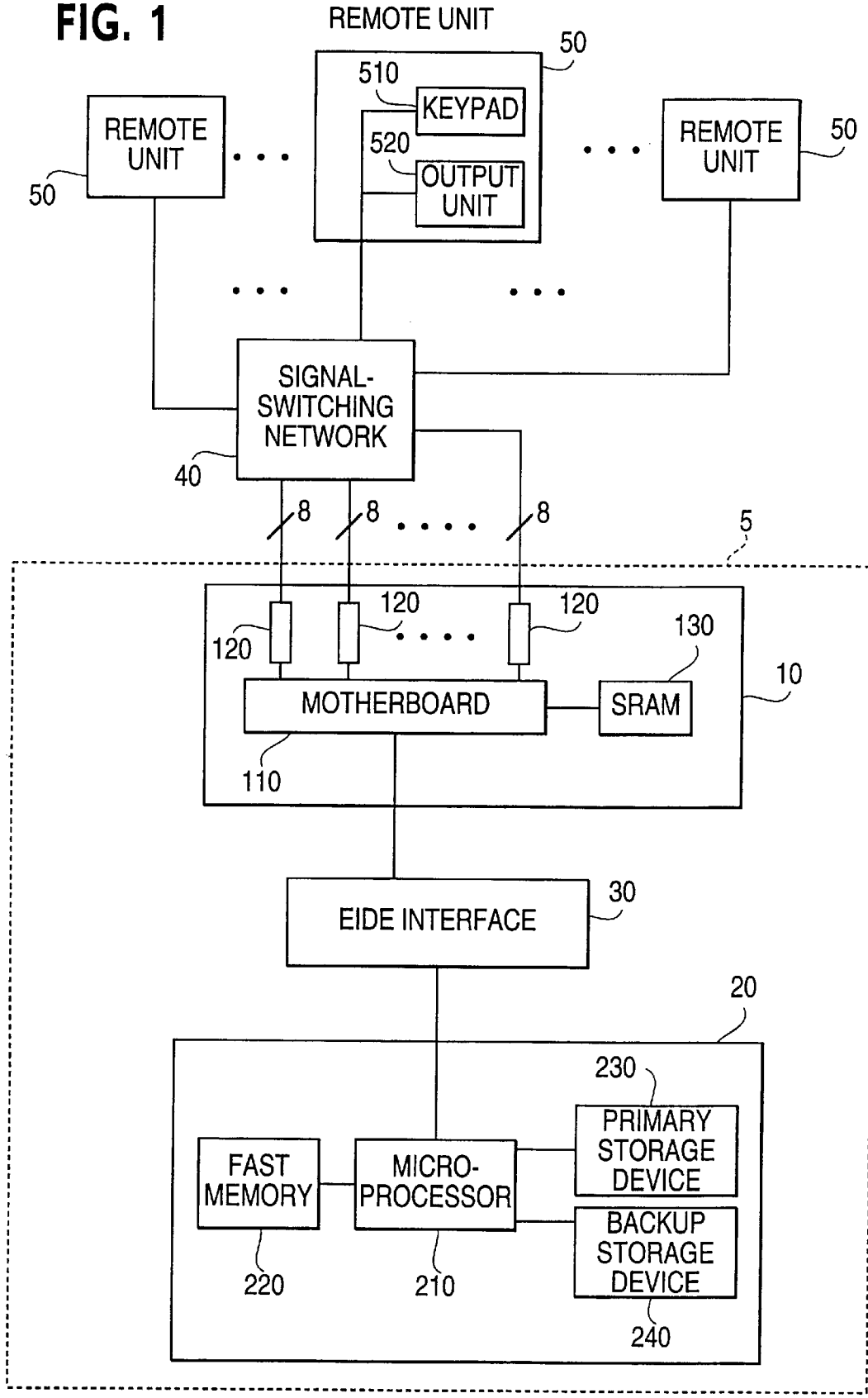
FIG. 1 is a block diagram of a telephone messaging system according to a preferred embodiment of the present invention.

FIG. 1 is a block diagram of a telephone messaging system according to a preferred embodiment of the present invention. As shown in FIG. 1, a central system 5 comprises a telephonic component 10, a computer 20, and an Enhanced Intelligent Drive Electronics (EIDE) interface 30. The central system 5 is connected to a conventional signal switching network that allows communication to or from a remote unit 50.

The telephonic component 10 includes a motherboard 110, a plurality of line cards 120, and a static random access memory (SRAM) 130. The plurality of line cards 120 are placed in slots in the motherboard 110, and each line card 120 serves as an interface to control a number of telephone lines. As a result, the telephonic component 10 can control a large number of telephone lines.

In the preferred embodiment, there are sixteen line cards connected to the motherboard 110, and each line card 120 can control eight telephone lines. This allows the telephonic component 10 of the preferred embodiment to control 128 telephone lines. Alternate embodiments can increase or decrease the number of available telephone lines by varying the number and capacity of line cards 120.

The computer 20 includes a microprocessor 210, a fast memory 220, a primary data storage device 230, and a backup data storage device 240. Preferably the fast memory 220 is a random access memory (RAM), and the primary data storage device 230 and the backup storage device 240 are magnetic recording devices such as hard disks. In the preferred embodiment, a copy of all of the messages are stored in each of the primary and backup data storage devices 230 and 240. The fast memory 220 in turn acts as a cache memory to speed up processing.

Both the primary and backup storage devices 230 and 240 contain the same information. If one of the storage devices 230 and 240 fails, the system can function, since the other will have a copy of all of the stored information. Information is preferably read from the primary data storage device 230, but information is written to both the primary and backup data storage devices 230 and 240.

The EIDE interface 30 serves to connect the telephonic component 10 and the computer 20. By serving as a buffer between the telephonic component 10 and the computer 20, the EIDE interface 30 allows the telephonic component to operate at voice speeds, i.e., 6800 cycles per second, while allowing the computer to function at much higher speeds, i.e., 4 million cycles per second.

The telephone switching system 40 is preferably a conventional telephone switching network as is used to route normal telephone calls. This can include regular line-based switching networks as well as cell-based switching networks. In alternate embodiments, any convenient signal switching or routing system could be used, e.g., the internet.

Each remote unit 50 includes a keypad 510 and an output device 520 and operates to obtain inputs from the users and to play messages from data storage unit 230 for the users. In the preferred embodiment, the remote units 50 are conventional telephones, and the keypad 510 and output device 520 are the telephone's keypad and handset, respectively. However in alternate embodiments, the remote units can be any device with a keypad 510 and any output device 520. The keypad 510 could be a standard twelve-key keypad, a computer keyboard, or the like. The output device 520 could be a speaker for playing a voice recording from the primary data storage device 230 or any device for aurally providing information.

System Operation

In operation, a user calls the central system 5 from a remote unit 50 via the signal switching network 40. One of the line cards 120 then breaks the signal received along a telephone line into the following sub-signals:

1. Receive, recording input.
2. Tone, Dual-Tone-Multi-Frequency (DTMF) NKS input.
3. Ring, need to take off-hook input.
4. Play, sound output.
5. Answer, take off-hook output.

The motherboard 110 then buffers these signals in the SRAM 130. At a fixed interval it sends or receives a burst of data from the computer 20. Preferably, each burst of data will pertain to only two of the 128 phone lines, but the burst will step through a sequence until all phone lines are covered. A sequence consists of 64 intervals of sending data followed by 64 intervals of receiving data. A burst takes 32 microseconds. An interval is 147 microseconds. Each burst consists of 128 units of data for each of the two phone lines, so they need new data only every 128 intervals.

The telephonic component 10 allows the telephone line cards 120 to work at voice speeds (6800 cycles per second), while the EIDE interface 30 to the computer 20 operates at computer speeds (4 million cycles per second). As a result, the computer 20 is not impeded by the difference in speed between voice signals and computer signals. In the preferred embodiment, an interval for the computer is 147 microseconds, so the EIDE interface 30 is idle 78% of the time.

| Burst | 32 Microseconds | 22% | |
|---|---|---|---|
| Idle | 115 Microseconds | 78% | |
| Interval | 147 Microseconds | 100% | 6800 intervals per second |

When the computer 20 inputs data from the telephonic component 10, it is initially stored in the fast memory device 220. In the preferred embodiment, this fast memory device 220 is a random access memory (RAM).

Figure 2:
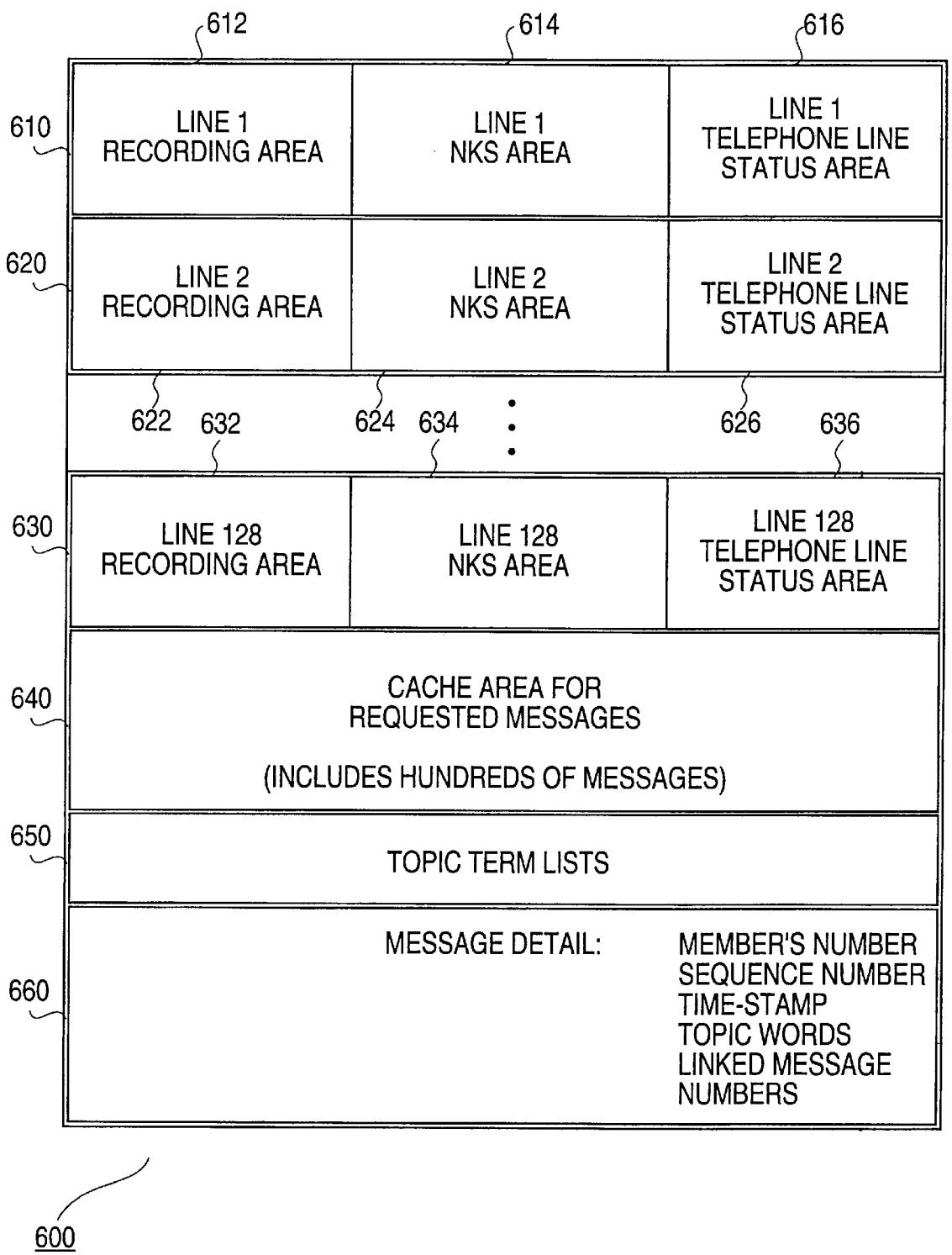
FIG. 2 is a memory block diagram showing the memory distribution of the fast memory of FIG. 1.

FIG. 2 is a memory block diagram showing the memory distribution of the fast memory of FIG. 1. There are preferably separate data areas 610, 620, 630, for each telephone line as well as a memory cache area 640, a topic term list area 650, and a message detail area 660. As shown in FIG. 2, the recording input is stored in a recording area 612, 622, 632; the tone data is stored in a numeric key sequence NKS area 614, 624, 634; and the line control data is stored in a telephone line status area 616, 626, 636. When a message is posted, it is written to data storage devices 230 and 240, the topic term lists 650 are updated with the topic terms for the message, and the message detail area 660 is updated. The message detail area 660 receives the new time stamp, topic words, and linked message numbers.

The topic term lists are stored in the term list area 650 for speed of access. They are not stored in the data storage devices 230 and 240 because they can be rebuilt from the detail data already stored in the data storage devices 230 and 240.

When the computer 20 outputs data to the telephonic component 10, it comes from the message cache area 640. If the message is not already in this cache area, it is read from the primary data storage device 230 into the message cache area 640. There it takes the place of a message that has not been accessed for at least 5 minutes. Preferably, the cache area 640 can hold hundreds of messages.

When the computer is turned on; the control data for each telephone line 616, 626, 636 is set to an on-hook status. If the ring (receiving an off-hook input) is detected, it goes off-hook (providing an answer output) and a request is made for the message list of member 0001. This list of messages tells the caller how to use the system. The answer output stays off-hook, unless there is no tone input from the telephone line for 45 seconds, at which time it returns to on-hook status. A preferred message 000101 for member 0001 is as follows:

---
FIRST MESSAGE for member 0001, message number 000101
Hello this is the Intranet.
Please make sure your phone is set to tone.
If you know how to use the system, you can start at any time.
The pound key is used to take you to the next message.
You should now press the pound key.
---

Data Storage and Access

Each message in the messaging system is stored in the primary and backup data storage devices 230 and 240. Each stored message is associated with one of the messaging system's members. Also associated with each stored message is a title, a time-stamp, and possibly one or more links. If a title is given, the title is preferably from two to four words long, and is used to describe the contents of the message. The title is used to associate the message with topic term lists, as described below. The links can be used to bridge the message to other messages. The time-stamp is used to place the message in topic term lists in chronological order.

When a message is posted and a new recording had been made, the new voice message (recording) replaces the old voice message. The new voice message is written to both data storage devices 230 and 240. When a message is posted, it is removed from its current position in the topic term lists, and is then placed at the end of each topic term list, as defined by its new title. In addition, when a message is posted, its detail record is also updated with the new title, links, and time-stamp. Then, its detail record is written to both data storage devices 230 and 240.

A message does not have to have a title. If a message is bridged to by a link, it need not have a title to be accessed. If a caller requests a member's message list, the caller can access the member's messages irregardless of whether the messages have titles.

In the preferred embodiment, if a message does have a title, it may also be accessed by a topic term. A message's topic terms are determined by finding all of the two-word combinations of the first four characters of each of the words in the title. Where a word in the title is fewer than four characters, the character '0' is inserted to bring the word up to four characters.

Thus, a message with a 1 word title cannot be placed in a topic term list. A message with a 2 word title will be placed in 1 topic term list. A message with a 3 word title can be placed in 3 topic term lists. And, a message with a 4 word title can be placed in 6 topic term lists. For example, if the 4 word title is "WESTERN PURPLE GLASS JAR," the four-character words associated with the title are "WEST," "PURP," "GLAS," AND "JAR0."

The six related topics terms are:

---
1. WESTPURP
2. WESTGLAS
3. WESTJAR0
4. PURPGLAS
5. PURPJAR0
6. GLASJAR0
---

The order in which the two words are given is not important, however. The topic terms could also have been:

---
1. PURPWEST
2. GLASWEST
3. JAR0WEST
4. GLASPURP
5. JAR0PURP
6. JAR0GLAS
---

The following simulation was performed to demonstrate the use of titles and topic terms. In this simulation, each message was given a 4 word title as follows:

---
| Word 1 | Major-name |
| Word 2 | Minor-name |
| Word 3 | Major-descriptor |
| Word 4 | Minor-descriptor |
---

1000 Major-names were picked at random from the dictionary. For each Major-name an average of 6 Minor-names were picked at random from the dictionary. As a result, there were 6000 Major/Minor-names.

100 categories were made from which the Major and Minor descriptors were picked. Each category was given 40 words for Major-descriptors and 80 words for Minor-descriptors. All the words were picked at random from the dictionary, but no word was used twice.

A category was picked at random for each Major-name. From this category a Major-descriptor and a Minor-descriptor were picked at random. Each of the 6000 Major/Minor-names was given an average of 10 such picks, giving a total of 60,000 titles.

Since each title had 4 words, they were all entered into 6 different topic term lists. As a result, there were 360,000 entries made to 208,937 topic term lists, or an average of 1.72 entries per list. The following results were obtained:

---
NUMBER OF ENTRIES IN A LIST (partial list)

| 144,774 | topic term lists with 1 entry |
| 37,713 | topic term lists with 2 entries |
| 12,486 | topic term lists with 3 entries |
| 5,373 | topic term lists with 4 entries |
| 2,468 | topic term lists with 5 entries |
| 1,271 | topic term lists with 6 entries |
| 745 | topic term lists with 7 entries |
| 515 | topic term lists with 8 entries |
| 398 | topic term lists with 9 entries |
| ... | |
| 4 | topic lists with 24 entries |

-continued

NUMBER OF DIFFERENT WORD PAIRS
MAPPED TO THE SAME TOPIC TERM

| 187,387 | lists with 1 unique pair | 89.66% |
| 18,334 | lists with 2 different pairs | 8.77% |
| 2,592 | lists with 3 different pairs | 1.24% |
| 522 | lists with 4 different pairs | 0.24% |
| 78 | lists with 5 different pairs | 0.03% |
| 25 | lists with 6 different pairs | 0.01% |
| 9 | lists with 7 different pairs | 0.00% |

Many other simulations of this type resulted in similar findings. From this simulation, the probability that a selected topic term will be unique has been approximated to be about 89%.

Access to the System

Access to the system is controlled by numeric key sequences (NKS). An NKS is entered by depressing numeric keys on the keypad 510 of the remote unit 50. If a number is required, the caller simply depresses the desired number on the keypad 510. If a character is required, the caller depresses the numeric key associated with the desired character. The standard correlation of numbers to letters used on conventional keypads is preferably used, i.e., 2 corresponds to ABC, 3 corresponds to DEF, etc. Also, if the "*" key is depressed during an NKS, the previous numeric key will be removed from the sequence. When an NKS is being entered the caller's current task will stop. After the NKS is entered the "#" key must be depressed, so the caller's new task will start.

The telephone messaging system can be accessed by two different types of caller: members and non-members. A member is a caller who has an identification number in the system, and a non-member is any other caller. At any time after being connected to the system, a caller can enter an identification number and password, identifying the caller as a member.

Non-member access allows the caller to request and hear messages on the system. Member access allows the caller the same access as a non-member, with the additional ability to place messages on the system.

Non-member Access

A caller, who is not identified as a member, is considered to be a non-member by default. As a non-member, a caller has access to request and hear all messages on the system, but not to add, delete, or change messages.

A non-member can request messages by member identifier or by topic term. A list of messages can be requested by entering a topic term or a member's identifier. In the preferred embodiment, a member identifier comprises a 4 digit number and a topic term comprises the first 4 characters of two words. To make the topic request, the non-member caller picks two words that pertain to the subject desired and enters the first 4 characters of word 1, followed by the first 4 characters of word 2, and then depresses the "#" key to continue. To make a member request, the caller enters the member's 4 digit number and then depresses the "#" key to continue.

During or after hearing a message, the caller can depress the "#" key to hear the next message in a list. To go back to the previous message, the caller can depress the "*" key. The system will say "FIRST" just before playing the first message in a list. It will say "LAST" just before playing the last message in a list. It will say "ONLY" if there is only one message in the list. The caller can jump to the @$^{th}$ message in a list by keying "J@#" where @ is the index number of the message. For example: to hear the 1$^{st}$ message in a list enter "J1#" and for the 10$^{th}$ enter "J10#." If the index number is too high, the last message in the list will be played.

At any point the caller can request another list by entering a new topic term or a new member's identifier. The system remembers each request, so the caller can go back to a previous request. The caller enters "P#" to go to the previous request and "J#" to jump back to the newest request. Also, each message can be linked to up to four other messages. A caller can access one of these linked messages directly from the current message without making a request. If a message has a link, a tone will sound after the message is played.

During or after listening to a message, the caller can hear the message's message number, the identification message of the member who posted the message, and/or turn to the list of the current member's messages. The caller can hear the message's message number by pressing "M#," the associated member's identification messages by entering "W#," and the member's message list by entering "T#."

A message number consists of 6 digits. The first 4 digits are the member's identifier and the last 2 digits are a sequence number. If the message number is 333304, it is the 4$^{th}$ message for member 3333. In this example, a caller could request the member's list of messages by entering "3333#." A caller can Turn to the member's messages without making a request by entering "T#."

Thus, after a message has started to play, the caller has the following options:

| | |
|---|---|
| 1. Enter "#" | to go to the next message. |
| 2. Enter "*" | to go to the previous message. |
| 3. Enter "1#" | to hear the 1$^{st}$ linked message. |
| 4. Enter "2#" | to hear the 2$^{nd}$ linked message. |
| 5. Enter "3#" | to hear the 3$^{rd}$ linked message. |
| 6. Enter "4#" | to hear the 4$^{th}$ linked message. |
| 7. Enter "J#" | to Jump back to the newest request. |
| 8. Enter "M#" | to hear the Message's message number. |
| 9. Enter "P#" | to go back to the Previous request. |
| 10. Enter "T#" | to Turn to the member's list of messages. |
| 11. Enter "W#" | to hear the member's Who message. |
| 12. Enter "J@# | to Jump to the @$^{th}$ message in a list. |
| 13. Enter "<4digits>#" | to request a member's message list. |
| 14. Enter "<6digits>#" | to hear a particular message. |
| 15. Enter "<8digits>#" | to request a topic term. |
| 16. Enter "<9digits>#" | to enter member's ID and password. |

Member Access

A member is someone who has an identification number. To be identifier as a member, a caller must enter an identification number including the member identifier, plus a password. In the preferred embodiment, the password is a 5-digit number. Thus, to be identified as a member the caller must enter in a 9 digit number followed by the "#" key. Once properly identified as a member, the caller has the same access as a non-member, described above, as well as the ability to add, edit, or delete messages on the system.

To post a message, a member starts by recording the message. Preferably a message is limited to a certain length to save recording space. In the preferred embodiment, a message cannot be more than 18 seconds in length.

After recording a new message, the member caller can link the new message to an existing message and/or provide the message with a title. If a title is created that is of proper length, two to four words in the preferred embodiment, the system will categorize the new message under a new and/or existing topic terms.

To create a title of the proper length, the caller picks two to four words that pertain to the subject desired. The caller needs only the first four characters of each word. If a word requires fewer than four characters, the caller should extend it to four characters by adding a zero character as many times as necessary. A word can be a number, such as 1998.

A title-word is entered in via a 5-key NKS. The first key is a 1, 2, 3, or 4 to designate it as one of the four title-words. The remaining keys are the title word. If the caller wanted the 4$^{th}$ title-word to be ABBA, the NKS would be "42222." When the message is posted, the system will automatically categorize it into as many topic terms as are necessary based on the title length, by matching the title-words accordingly.

A message can also be linked to other messages, so the same information does not have to be repeated. This saves space on the system by eliminating duplicate information and it allows the caller to save time by not hearing the same information over and over. Before posting a message, the caller can enter 4 such links.

A link is a 7-key NKS. The first key is a 1, 2, 3, or 4 to designate it as one of the four links. The remaining keys are the message number of the linked-to message. For example, if the caller wanted the 1$^{st}$ link to message 456789, the NKS would be "1456789." In addition, each message is always linked to the identification message of its creator. This identification message is played, when the caller enter a NKS of "W," i.e., executes a "who" command.

In summary, after a caller is identified as a member, the following functions are allowed, in addition to the message request functions listed above that are allowed to non-members:

1. "T@#" to Test a message (already posted).
2. "M@#" to Make a recording (selects the @th message).
3. "W@#" to Work on a message (selects the @th message).
4. "P@#" to Post the message (only after the M or W).

A sequence number is preferably used to identify which message is to be selected. The "@" symbol in the above list was used in place of the sequence number of the message. For the member's 1st message, replace the "@" symbol with a "1." For the member's 16th message, replace the "@" symbol with "16." A member can Test the member's @$^{th}$ message by using the T function. If the member enters "T4#," it will play the member's 4$^{th}$ message.

A member can use the M function to Make a recording for the @$^{th}$ message. To Work on a message without making a new recording, the caller can use the W function. The updated message will not be placed on the system until the member uses the P function to Post it.

Once a sequence number of a message has been selected by function M or W, the following functions can be performed:

1. "P0#" to Purge title-words and links.
2. "T0#" to Test the recording (only after the M function).
3. "W0#" to hear the Words and links.
4. "1<word>#" to enter the 1$^{st}$ title word.
5. "2<word>#" to enter the 2$^{nd}$ nd title word.
6. "3<word>#" to enter the 3$^{rd}$ title word.
7. "4<word>#" to enter the 4$^{th}$ title word.
8. "1<linked>#" to enter the 1$^{st}$ linked message number.
9. "2<linked>#" to enter the 2$^{nd}$ linked message number.
10. "3<linked>#" to enter the 3$^{rd}$ linked message number.
11. "4<linked>#" to enter the 4$^{th}$ linked message number.

"P0#" will remove all previously entered words and links for the message. "T0#" can be used to replay the recording. "W0#" can be used to hear the words and links, which will be used if the message is posted.

A title can have four title words. Only the first 4 characters of the word are entered. To enter GLASS as the 1$^{st}$ word, key "1GLAS#." To enter JAR as the 4$^{th}$ word, key "4JAR0#." If the word is fewer than 4 characters long, the member must extend it to 4 characters with the "0" character. A message can have up to 4 links.

Message numbers are 6 digits in length. To enter message number 555501 as the 1$^{st}$ link, the member should key in "1555501#." To enter message number 666604 as the 3$^{rd}$ link, the member should key in "3666604#." After these functions have been performed, the member must use the Post function to place the message on the system.

The list below is a summary of the numeric key sequences (NKS) for the preferred embodiment. The following numeric key sequences are allowed without member identification:

| NKS | Operation |
|---|---|
| 1 | Play the 1$^{st}$ linked message. |
| 2 | Play the 2$^{nd}$ linked message. |
| 3 | Play the 3$^{rd}$ linked message. |
| 4 | Play the 4$^{th}$ linked message. |
| J | Jump back to the newest request. |
| M | Play the Message's message number. |
| P | Go back to the Previous request. |
| T | Turn to the member's message list. |
| W | Play the Who message for the current message. |
| J@ | Jump to the @$^{th}$ message in the list. |
| 1234 | Requests the member's list (4 keys). |
| 123456 | To hear a particular message (6 keys). |
| 12345678 | Requests the topic term (8 keys). |
| 123456789 | To enter the member's ID number and password (9 keys). |

The following numeric key sequences are allowed only to members, after member identification:

| NKS | Operation |
|---|---|
| T@ | To Test the member's @$^{th}$ message. |
| M@ | To Make the member's @$^{th}$ message (recording). |
| W@ | To Work on the member's @$^{th}$ message (no recording). |

The following numeric key sequences area allowed while a message is being created or edited, after M@ or W@ has been pressed to select a message:

| NKS | Operation |
|---|---|
| P0 | Purge the title-words and links. |
| T0 | Test the current recording. |
| W0 | To hear the title Words and links. |
| 1!!!! | To enter title-word 1. |
| 2!!!! | To enter title-word 2. |
| 3!!!! | To enter title-word 3. |
| 4!!!! | To enter title-word 4. |
| 1!!!!!!! | To enter linked-to message 1. |
| 2!!!!!!! | To enter linked-to message 2. |
| 3!!!!!!! | To enter linked-to message 3. |
| 4!!!!!!! | To enter linked-to message 4. |
| P@ | To Post the @$^{th}$ message. |

A summary of the variables used within this preferred embodiment are given below.

| | TITLE VARIABLES | |
|---|---|---|
| Variable | Preferred Value | Usage |
| i | 1 to 24 | Number of characters in a title word. |
| j | 1 to 4 | Index number of a title word. |
| k | 4 | Number of characters in a topic word. |
| m | 2 | Number of topic words in a topic term. |
| n | 4 | Maximum number of title words in a title. |
| q | 6 | Maximum number of topic terms in a title. |

The calculation of q can be made according to the following formula:

$$q = \frac{n!}{m! * (n-m)!} = \frac{4!}{2! * 2!} = \frac{24}{4} = 6$$

| | SUBJECT VARIABLES | |
|---|---|---|
| Variable | Preferred Value | Usage |
| r | 1 to 24 | Number of characters in a subject word. |
| p | 1 or 2 | Index number of a subject word. |
| k | 4 | Number of characters in a topic word. |
| m | 2 | Number of topic words in a topic term. |

While the preferred embodiment above uses four-character topic words in eight-character topic terms, four-character member ID's, five-character passwords, six-character message identifiers, etc., any variety of lengths may be used, provided they are chosen such that the system can adequately differentiate between different inputs. In addition, the various function indicators such as "*" and "#" can be replaced with any other keys that indicate the same function.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation illustrated and described above. Hence, all suitable modifications and equivalents may be considered as falling within the scope of the invention.

What is claimed is:

1. A method for storing messages in a remotely-accessed messaging system, comprising the steps of:

storing a message in memory;

providing a title for the message, the title having n title words;

forming n topic words, each having an ideal word length of k characters by making a $j^{th}$ topic word correspond to $j^{th}$ title word if the length of the $j^{th}$ title word is equal to the ideal word length;

making the $j^{th}$ topic word correspond to the first k characters of the $j^{th}$ title word if the length of the $j^{th}$ title word is greater than the ideal word length; and making the $j^{th}$ topic word correspond to the th title word plus (k minus i) filler characters, where i is the length of the $j^{th}$ title word, if the length of the $j^{th}$ title word is less than the ideal word length;

forming q topic terms associated with the stored message by combining the n topic words in combinations of m topic words, wherein n is an integer greater than one, k is an integer greater than one, m is an integer greater than one but not greater than n, j is an index that varies from 1 to n, and q equals the number of different combinations of n different things taken m at a time without repetition.

2. A method for storing messages in a remotely-accessed messaging system, as recited in claim 1, further comprising the step of requesting to hear messages in a topic term list by entering a topic term for particular subject words.

3. A method for storing messages in a remotely-accessed messaging system, as recited in claim 2, wherein the topic term comprises m topic words having the ideal word length of k characters.

4. A method for storing messages in a remotely-accessed messaging system, as recited in claim 3, wherein each topic word is formed from one of p subject words by the steps of:

making the $p^{th}$ topic word correspond to the $p^{th}$ subject word if the length of the $p^{th}$ subject word is equal to the ideal word length;

making the $p^{th}$ topic word correspond to the first k characters of the $p^{th}$ subject word if the length of the $j^{th}$ subject word is greater than the ideal word length; and making the $p^{th}$ topic word correspond to the $p^{th}$ subject word plus a (k minus r) filler characters, where r is the length of the $p^{th}$ subject word, if the length of the $p^{th}$ subject word is less than the ideal word length;

where p is an index that varies from 1 to m.

5. A method for storing messages in a remotely-accessed messaging system, as recited in claim 1, wherein messages stored in the messaging system can be requested by search topic term.

6. A method for storing messages in a remotely-accessed messaging system, as recited in claim 5, wherein the search topic term is formed from one or more search title words.

7. A method for storing messages in a remotely-accessed messaging system, as recited in claim 1, wherein each stored message can be linked directly to a plurality of other messages, and the other messages can be accessed directly from the stored message.

8. A method for storing messages in a remotely-accessed messaging system, as recited in claim 1, wherein n is an integer between 2 and 4.

9. A method for storing messages in a remotely-accessed messaging system, as recited in claim 1, wherein k is equal to 4.

10. A method for storing messages in a remotely-accessed messaging system, as recited in claim 1, wherein the filler character is the zero character, "0."

11. A system for storing and selectively retrieving a plurality of bulletins using a numeric key sequence, comprising:

means for storing the plurality of auditory bulletins in a memory device;

means for entering a plurality of numeric key sequences for each of the plurality of auditory bulletins;

means for adjusting the length of every numeric key sequence to four digits;

means for combining the plurality of numeric key sequences associated with a given auditory bulletin into pairs, each pair making an identifier numeric key sequence of eight digits;

means for catering an eight digit search sequence;

means for selecting one of the plurality of auditory bulletins having an identifier numeric key sequence that matches the eight digit search sequence; and means for playing the selected auditory bulletin.

12. A system for storing and selectively retrieving bulletins using a numeric key sequence, as recited in claim 11, wherein the numeric key sequence is generated by a touch tone phone.

13. A method for storing and selectively retrieving a plurality of bulletins using a numeric key sequence, comprising:

storing the plurality of auditory bulletins in a memory device;

entering a plurality of numeric key sequences for each of the plurality of auditory bulletins;

adjusting the length of every numeric key sequence to four digits;

combining the plurality of numeric key sequences associated with a given auditory bulletin into pairs, each pair making an identifier numeric key sequence of eight digits;

entering an eight digit search sequence;

selecting one of the plurality of auditory bulletins having an identifier numeric key sequence that matches the eight digit search sequence; and playing the auditory bulletin.

14. A method for storing and selectively retrieving bulletins using a numeric key sequence, as recited in claim 13, wherein the numeric key sequence is generated by a touch tone phone.

* * * * *